Figure 1:
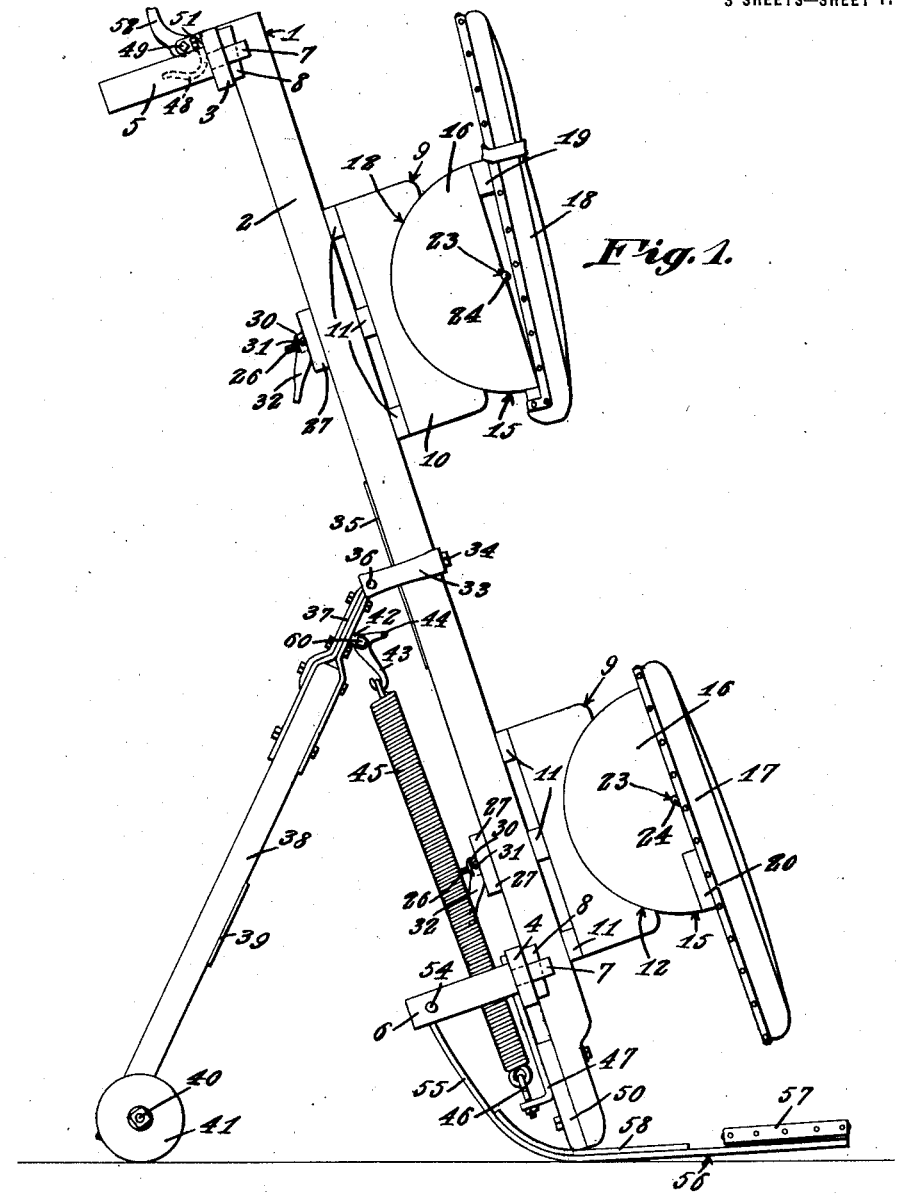

G. C. OAKES.
CHIROPRACTOR'S TABLE.
APPLICATION FILED JAN. 28, 1919.

1,339,038.

Patented May 4, 1920.
3 SHEETS—SHEET 1.

G. C. Oakes, Inventor

Witness

By C. A. Snow & Co.
Attorneys

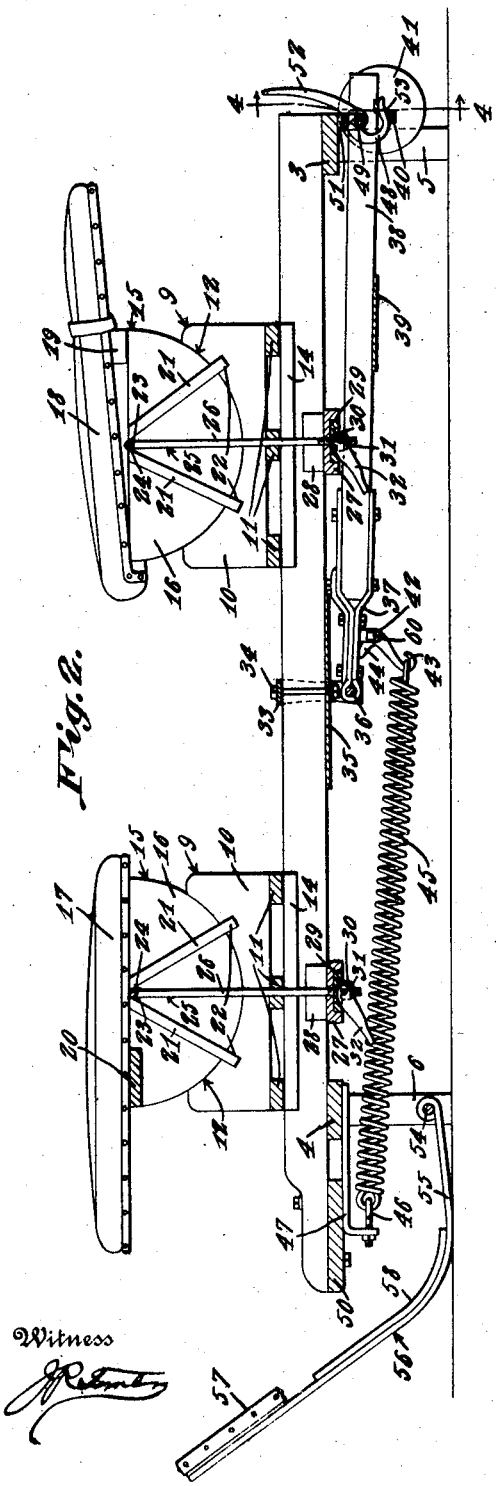

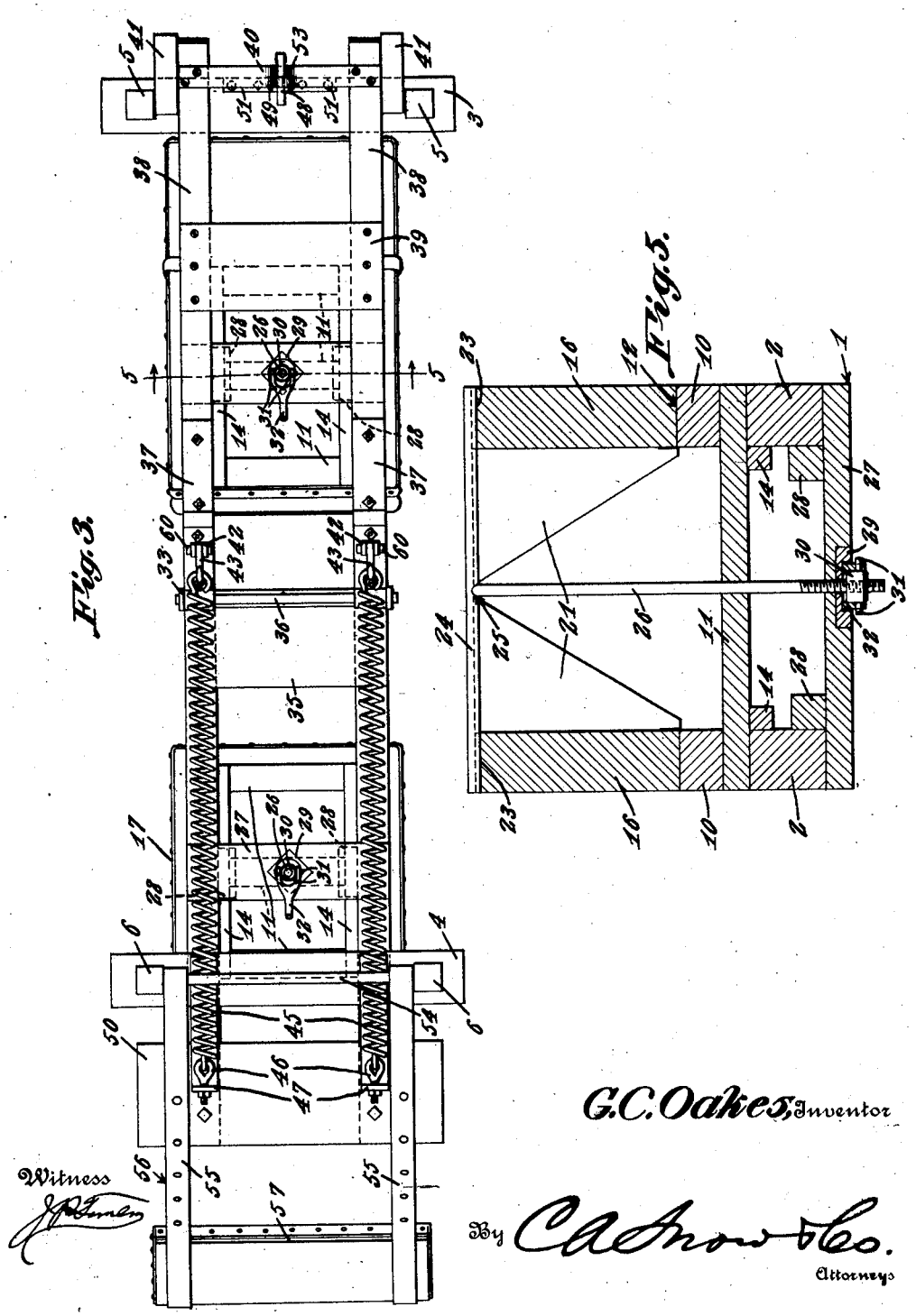

UNITED STATES PATENT OFFICE.

GEORGE C. OAKES, OF MERCED, CALIFORNIA.

CHIROPRACTOR'S TABLE.

1,339,038. Specification of Letters Patent. Patented May 4, 1920.

Application filed January 28, 1919. Serial No. 273,680.

*To all whom it may concern:*

Be it known that I, GEORGE C. OAKES, a citizen of the United States, residing at Merced, in the county of Merced and State of California, have invented a new and useful Chiropractor's Table, of which the following is a specification.

The device forming the subject matter of this application is a table, adapted to be used by chiropractors, and by others, and the invention aims to provide a table including a main frame which may be moved readily from an approximately vertical position to an approximately horizontal position, novel means being provided for assisting in the operation of swinging the main frame from a horizontal position back into an upright position. Another object of the invention is to provide novel means whereby pads which support the body of the patient may be moved toward and away from each other longitudinally of the main frame, means being provided whereby the pads may be tilted.

The invention aims, further, to provide a table which is so constructed that the patient can be handled on the table and can occupy and leave the table without danger of disturbing spinal adjustments which have been made by the operator.

In the drawings:—

Figure 1 shows in side elevation, a table constructed in accordance with the invention, the main frame of the table being in an approximately vertical position; Fig. 2 is a fragmental longitudinal section, wherein the main frame is shown in lowered or approximately horizontal position; Fig. 3 is a bottom plan; Fig. 4 is a cross section taken approximately on the line 4—4 of Fig. 2, parts being omitted; Fig. 5 is a cross section taken approximately on the line 5—5 of Fig. 3.

The table forming the subject matter of this application includes a main frame, denoted generally by the numeral 1, and including side bars 2 connected by cross pieces 3 and 4, and by a cross plate 50. Legs 5 extend through the cross piece 3 and legs 6 extend through the cross piece 4, the legs having reduced ends projecting through the cross pieces, there being securing wedges 8 extended through the ends 7 and coöperating with the cross pieces 3 and 4 to hold the legs securely in place.

Carriages 9 are mounted for longitudinal reciprocation on the side bars 2 and include end plates 10 connected by cross strips 11, the end plates having concaved seats 12 in their edges. The cross strips 11 carry cleats 14 extended longitudinally of the side bars 2 of the main frame 1, and coöperating therewith to aid in guiding the carriages 9 in their longitudinal movement on the main frame 1.

Pad frames 15 are provided, the same including semi-circular plates 16 mounted to rock for adjustment in the seats 12 of the end plates 10 of the carriages 9, one set of plates 16 carrying a lower pad 17, and the other set of plates carrying an upper pad 18. The pad 18, which is a head pad, is disposed at a slight inclination by means of a cross bar 19 connecting the corresponding plates 16, the plates 16 which are individual to the pad 17 being united by a cross bar 20. Triangular braces 21 are assembled with the plates 16 of the pad frames and, as shown at 22, overlap the end plates 10 of the carriages 9 to hold the pad frames 15 in place for rocking movement, the plates 16 of the pad frames being mounted to rock in the concaved seats 12 of the end plates 10 of the carriages. The upper edges of the plates 16 of the pad frames 15 are supplied with notches or seats 23 receiving the ends of the heads 24 of T members 25 including shanks 26 passing through the central cross strips 11 and through clamping bars 27 coacting with the lower edges of the side bars 2 of the main frame 1. There are cleats 28 on the clamping bars 27, which, coacting with the inner sides of the bars 2, aid in guiding the clamping bars when the same, along with the carriages 9, are slid longitudinally of the main frame. Thrust plates 29 are seated against rotation in the clamping bars 27. Nuts 30 are threaded on the shanks 26 of the T members 25 and coöperate with the thrust plates 29, the nuts 30 having trunnions 31 on which cam levers 32 are pivoted, the cam levers being adapted to coöperate with the thrust plates 29 in a way which will be described hereinafter.

Intermediate their ends, the side bars 2 of the main frame 1 are straddled by a bracket 33 connected by bolts 34 or otherwise to a plate 35 coacting with the lower edges of the side bars 2. In the extremities of the bracket 33, a rod 36 is mounted, the same carrying hangers 37 which serve to connect an auxiliary supporting frame with the main frame 1.

The auxiliary supporting frame comprises longitudinal bars 38, to which the hangers 37 are attached, the bars 38 being united intermediate their ends by a connecting plate 39. Mounted in the lower ends of the bars 38 is an axle 40, on the ends of which, wheels 41 are journaled. Angle pieces 51 are secured to the cross piece 3 and carry a pivot element 49 on which a hook 48 is mounted to swing, the hook including a handle 52 whereby the hook may be manipulated. The intermediate portion of the axle 40 is slit longitudinally and offset to form an eye 53 wherewith the hook 48 is adapted to engage. There are ears 42 on the hangers 37, on which hooks or attaching members 43 are pivoted as shown at 60, the hooks having angularly disposed end portions or fingers 44 adapted to coöperate with the hangers 37 of the auxiliary supporting frame, in a manner and for a purpose which will be set forth hereinafter. Retractile springs 45 are secured at one end to the hooks 43, the other ends of the retractile springs being attached to eye bolts 46 carried by brackets 47 mounted on the cross plate 50 and on the cross piece 4.

The legs 6 are connected by a bar 54 on which the curved arms 55 of a foot frame 56 are adapted to swing, the arms 55 carrying a foot rest 57, and being reinforced intermediate their ends as shown at 58.

Although the method of operating the table will depend to some extent on the taste of the chiropractor in charge of the case, it may be stated that, assuming that the device is arranged as shown in Fig. 1, the patient may stand on the foot rest 57 and recline against the pads 17 and 18. The main frame 1 then may be rocked downwardly and forwardly, the arms 55 of the foot frame 56 serving as rockers, the arms coöperating with the lower ends of the side bars 2. During this operation, the auxiliary frame, of which the bars 38 constitute a part, moves into approximate parallelism with the main frame 1 as the main frame assumes a horizontal position, shown in Fig. 2. The springs 45 are put under tension. After the main frame 1 has been lowered into the horizontal position shown in Fig. 2, the hook 48, being operated by means of the handle 52, is engaged with the eye 53 of the axle 40, and, thus, the wheels 41 may be held out of engagement with the floor, the main frame 1 being supported on the legs 5 and 6.

The patient is now in an approximately horizontal position, and is supported by the pads 17 and 18. The nuts 30 may be loosened, the cam levers 32 constituting means whereby the nuts may be rotated. In this way, the hold of the heads 24 of the T members 25 on the upper edges of the plates 16 may be loosened, and the plates may be rocked in the seats 12 of the carriages 9, so that the pads 17 and 18 may be adjusted at any angle with respect to the horizontal. It will be obvious that, when the nuts 30 are loosened as aforesaid, the carriages 9, along with the pads 17 and 18, may be adjusted longitudinally of the main frame 1 on the side bars 2 thereof. The nuts 30 may be rotated by means of the cam levers 32 until the nuts bind against the thrust plates 29, the clamping bars 27 being bound, in turn, against the side bars 2 of the main frame 1. In this way, the carriages 9 may be held against shifting longitudinally of the main frame 1 and, further, the pads 17 and 18 may be held at any angle with respect to the horizontal, to which they may have been adjusted.

It is to be observed that the fingers 44 of the hooks 43 coöperate with the hangers 37 to locate the springs 45 in such a way that, when the parts are arranged as shown in Fig. 2, the springs 45 will exert a pull below the rod 36. Consequently, when the hook 48 is released from the eye 53 of the axle 40, so that the auxiliary frame, comprising the bars 38, can respond to the action of the springs 45, the said springs constitute an assisting means for restoring the parts to the position of Fig. 1, when the head or upper end of the main frame 1 is swung upwardly by the operator. The foot rest 57 constitutes a means whereby the patient may be mounted on the table and may dismount therefrom, without disturbing any adjustments which the doctor of chiropractic may have made.

When the cam levers 32 are swung toward parallelism with respect to the thrust plates 29, the levers bind against the plates and hold the nuts against rotation.

Although I have shown and described a preferred embodiment of my invention, it is to be understood that, within the scope of what is claimed, changes falling within the skill of a mechanic may be made without departing from the spirit of the invention or sacrificing the utility thereof.

Having thus described the invention, what is claimed is:—

1. In a device of the class described comprising a main frame provided with means for supporting a patient, the main frame being adapted to swing between approximately vertical and approximately horizontal positions with one end of the frame as a point of swinging movement; an auxiliary frame pivoted to the intermediate portion of the main frame and provided with means for facilitating the sliding of the lower end of the auxiliary frame on a floor, whereby the auxiliary frame may swing backwardly toward the other end of the main frame when the main frame is swung from an approximately vertical position to an approximately horizontal position; and a spring extended between the auxiliary frame and the main frame and constituting, at different times, mechanism for cushioning the downward swinging movement of the main frame toward an approximately horizontal position and mechanism for assisting the movement of the main frame from an approximately horizontal position to an approximately vertical position.

2. A device of the class described, constructed as set forth in claim 1, and further characterized by the provision of a curved foot frame pivoted to the main frame and constituting a rocker on which the swinging movement of the main frame takes place, the foot frame being provided with a foot rest.

3. In a device of the class described, a main frame; an auxiliary supporting frame pivoted to the main frame; carriages mounted to slide longitudinally of the main frame; pad frames mounted to tilt on the carriages; and a combined means for holding the carriages in adjusted positions longitudinally of the main frame and for holding the pad frames in adjusted tilted positions on the carriages.

4. In a device of the class described, a main frame; an auxiliary supporting frame pivotally assembled with the main frame; pad supporting carriages adjustable on the main frame; and a foot frame pivotally connected with the main frame, the foot frame being curved to form a rocker for the main frame; and a foot rest constituting a part of the foot frame.

5. A device of the class described, constructed as set forth in claim 1, and further characterized by the fact that the main frame is provided with legs whereon the main frame is supported when the same is in an approximately horizontal position; and means for connecting the auxiliary frame to the main frame releasably, thereby to hold the auxiliary frame out of contact with a floor when the main frame is supported on the legs.

6. In a device of the class described, a main frame; a carriage mounted for sliding movement on the main frame and having curved seats; a pad comprising side plates mounted to rock in the seats; a transverse part slidable along the main frame with the carriage; a T member including a head engaging the side plates and a shank coöperating with said transverse part; a tightening device on the shank and engaging said part; and means for mounting the main frame for swinging movement in a vertical plane.

In testimony that I claim the foregoing as my own I have hereto affixed my signature in the presence of two witnesses.

GEO. C. OAKES.

Witnesses:
P. J. THORNTON,
MARGARITA WINTON.